(12) United States Patent
Thielert

(10) Patent No.: US 7,604,686 B2
(45) Date of Patent: Oct. 20, 2009

(54) METHOD AND DEVICE FOR COOLING VAPOR IN A DESORPTION COLUMN

(75) Inventor: Holger Thielert, Dortmund (DE)

(73) Assignee: Uhde GmbH, Dortmund (DE)

( * ) Notice: Subject to any disclaimer, the term of this patent is extended or adjusted under 35 U.S.C. 154(b) by 721 days.

(21) Appl. No.: 10/538,271

(22) PCT Filed: Aug. 6, 2003

(86) PCT No.: PCT/EP03/08681

§ 371 (c)(1),
(2), (4) Date: Apr. 10, 2006

(87) PCT Pub. No.: WO2004/052509

PCT Pub. Date: Jun. 24, 2004

(65) Prior Publication Data

US 2006/0230932 A1    Oct. 19, 2006

(30) Foreign Application Priority Data

Dec. 11, 2002  (DE) ............................... 102 58 067

(51) Int. Cl.
*B01D 53/14* (2006.01)

(52) U.S. Cl. ............................. 95/228; 95/181; 95/193; 95/194; 95/209; 95/235; 96/234; 96/242; 203/21; 203/42

(58) Field of Classification Search .......... 95/178–179, 95/181, 193–194, 209, 228, 235; 96/234, 96/242; 203/21, 42

See application file for complete search history.

(56) References Cited

U.S. PATENT DOCUMENTS 2,756,841 A * 7/1956 Asendorf ..................... 95/181
5,133,949 A * 7/1992 Elgue et al. ................. 423/220
5,507,356 A * 4/1996 Roth et al. ................... 165/111

FOREIGN PATENT DOCUMENTS

| DE | 27 02 583 | | 7/1978 |
| DE | 37 14016 | | 11/1988 |
| DE | 43 00 131 | A1 | 7/1994 |

OTHER PUBLICATIONS

International Search Report.

* cited by examiner

*Primary Examiner*—Duane Smith
*Assistant Examiner*—Ives Wu
(74) *Attorney, Agent, or Firm*—Collard & Roe, P.C.

(57) ABSTRACT

The invention relates to a method for cooling rising vapor (3) in a desorption column (2) by means of a condenser, which is situated at the head of the desorption column, is configured as an indirect heat exchanger and is traversed by a coolant (1). According to said method, the coolant enters at the bottom of the condenser (1) and flows upwards through conduits (8) that are arranged vertically in the condenser. The coolant is enriched with hydrogen sulphide prior to its entry into the condenser (1) and after the absorption of heat, escapes as an overflow (6) from the top of the condenser (1) through upper openings (10) of the conduits (8). The invention also relates to a desorption column (2) for carrying out said method.

2 Claims, 1 Drawing Sheet

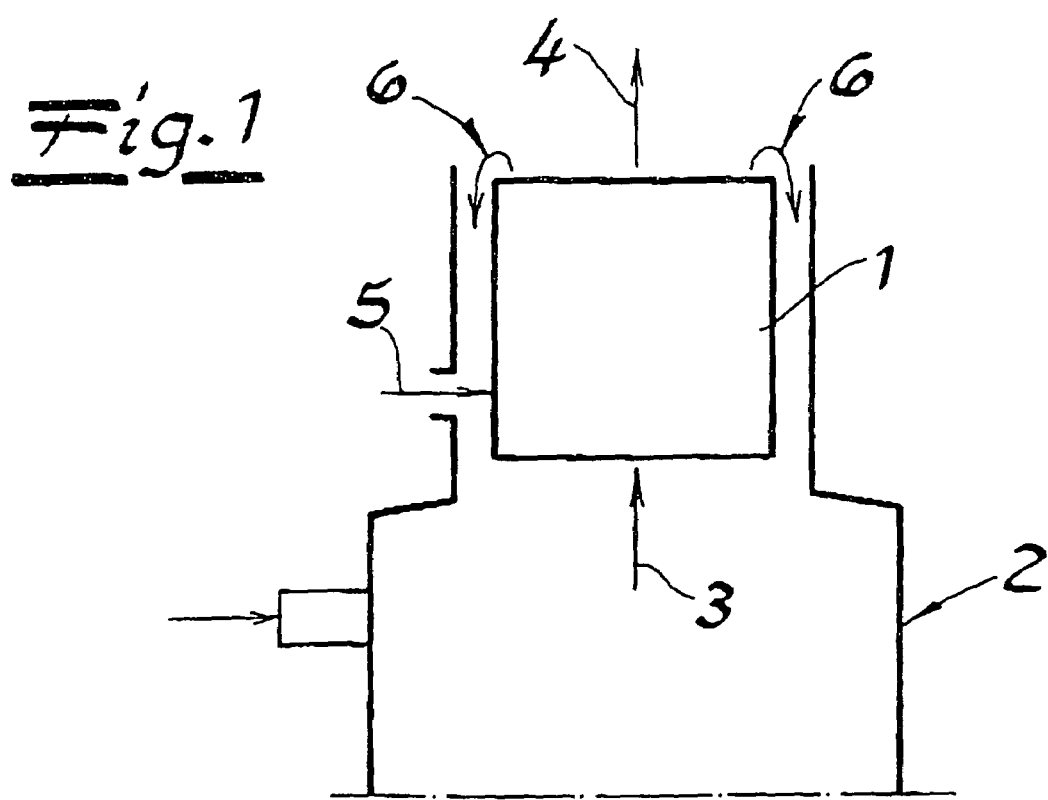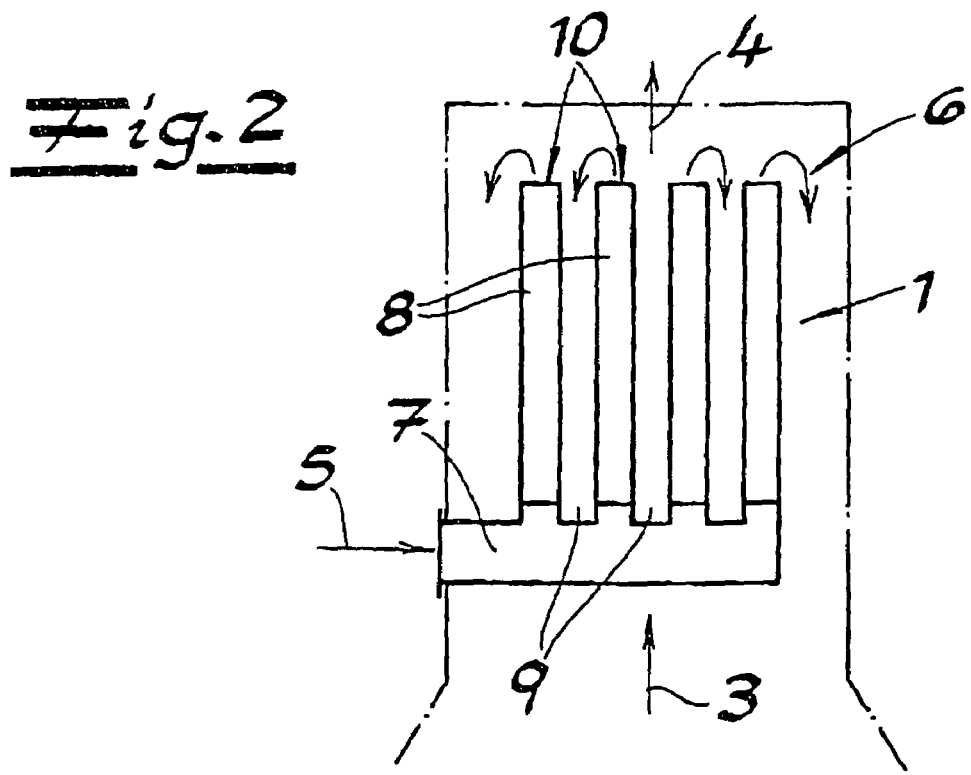

METHOD AND DEVICE FOR COOLING VAPOR IN A DESORPTION COLUMN

CROSS REFERENCE TO RELATED APPLICATIONS

Applicant claims priority under 35 U.S.C. §119 of German Application No. 102 58 067.7 filed on Dec. 11, 2002. Applicant also claims priority under 35 U.S.C. §365 of PCT/EP2003/008681 filed on Aug. 6, 2003. The international application under PCT article 21(2) was not published in English.

The invention relates to a method for cooling rising vapors in a desorption column by means of a condenser disposed at the head of the desorption column, configured as an indirect heat exchanger, through which a coolant flows, whereby the coolant enters into the condenser at the bottom and flows upward through vertical channels disposed in the condenser.

The head of a desorption column is usually equipped with a condenser that is operated with cooling water and is configured as an indirect heat exchanger. In the operation of an indirect heat exchanger, there is no direct contact between the fluid that absorbs the heat and the fluid that gives off the heat, since the fluids are separated from one another by means of flow guide elements, and the heat transport takes place through the flow guide elements. In the case of a load change of the desorption column, there is the risk that the cooling water temperature changes and that carbonate precipitation occurs. This is particularly the case if the cooling water temperature required for the desired operating state of the desorption column is high at the exit of the condenser. Carbonate precipitation at the heat transfer surfaces increasingly worsens the heat transfer behavior in the condenser and, in the final analysis, results in failure of the apparatus. This problem is circumvented in that the vapors are cooled by means of a direct heat exchange, e.g. sprinkling of the column head with cooling water. However, this direct heat exchange is difficult to regulate, because the cooling surface is not defined.

The invention is based on the task of indicating a method having the characteristics described initially, in which no carbonate precipitation occurs at the heat exchanger surfaces impacted by the cooling water, independent of the operating state of the desorption column. Furthermore, a good regulation possibility should exist in case of a load change.

According to the invention, this task is accomplished in that a coolant containing hydrogen sulfide is used, and that the coolant exits as an overflow, by means of top-side openings of the channels, at the top of the condenser, after the heat absorption has occurred. The cooling surface of the condenser is pre-determined by the heat exchanger surfaces. In the case of a load change of the desorption column, the temperature of the cooling surfaces can be adjusted very simply and precisely, by means of the cooling water amount. In this connection, deposition of carbonates on the heat exchanger surfaces can be effectively prevented by means of conducting the method in accordance with the invention, with the use of a coolant that contains hydrogen sulfide.

According to a preferred embodiment of the method according to the invention, the overflow flows into the desorption column. By means of applying a cooling water that contains hydrogen sulfide into the desorption column, the hydrogen sulfide is directly separated from the cooling water again after the heat transfer, since the hydrogen sulfide, which has a very low boiling point, leaves the desorption column at the head, together with the cooled vapors, while the water, which has a clearly lower boiling point, flows into the sump of the desorption column. Thus, no additional process step is necessary to remove the hydrogen sulfide from the cooling water again.

The object of the invention is also a desorption column to implement the method.

In the following, the invention will be explained in detail, using a drawing that represents an embodiment merely as an example. The drawing shows:

FIG. 1 a schematic representation of a condenser disposed at the head of a desorption column, and FIG. 2 a detailed representation of the condenser shown in FIG. 1.

FIG. 1 shows a condenser 1 that is disposed at the head of a desorption column 2. Vapors 3 rise from the desorption column, and are cooled by means of the condenser. The vapors 3 enter into the condenser 1 at the bottom. The non-condensing gases 4 that are cooled at heat exchanger surfaces of the condenser exit at the top of the condenser 1 and flow further upward. The cooling water 5, which has been enriched with hydrogen sulfide, according to the invention, enters into the condenser at the bottom. During the heat absorption, the cooling water 5 flows upward in the condenser and exits at the top of the condenser as an overflow 6. The overflow 6 flows into the desorption column 2.

FIG. 2 shows the structure of the condenser 1 according to the invention. The condenser 1 has a distributor device 7 as well as channels 8 that form heat exchanger surfaces, and is disposed in the column head of the desorption column 2. The cooling water 5 can flow through the distributor device 7; the latter serves to distribute the cooling water 5 that flows into the condenser 1. The distributor device 7 is rigidly connected with the channels 8 through which the fluid flows, which channels are disposed vertically. The sections 9 between the channels 8 are selected in such a manner that the rising vapors 3 can flow around the outside surfaces of the channels 8. The channels have top openings 10 from which the coolant exits.

The invention claimed is:

1. Method for cooling rising vapors (3) in a desorption column (2) by means of a condenser (1) disposed at the head of the desorption column (2), configured as an indirect heat exchanger, through which cooling water flows, whereby the cooling water enters into the condenser (1) at the bottom and flows upward through vertical channels (8) disposed in the condenser (1), wherein cooling water containing hydrogen sulfide is used, wherein the cooling water exits as an overflow (6), by means of top-side openings (10) of the channels (8), at the top of the condenser (1), after the heat absorption has occurred, and wherein the overflow (6) flows into the desorption column (2).

2. Desorption column for carrying out the method according to claim 1, having a column head, a condenser (1) disposed therein, which has channels (8) through which cooling water flows, whereby the channels (8) are disposed vertically and flow can take place through them from the bottom to the top, and they form heat exchanger surfaces for cooling rising vapors, and whereby the channels (8) have top openings and thereby form an overflow (6) for the cooling water, which flows into the column (2).

* * * * *

UNITED STATES PATENT AND TRADEMARK OFFICE
CERTIFICATE OF CORRECTION

PATENT NO. : 7,604,686 B2  Page 1 of 1
APPLICATION NO. : 10/538271
DATED : October 20, 2009
INVENTOR(S) : Holger Thielert It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 852 days.

Signed and Sealed this

Fourteenth Day of December, 2010

David J. Kappos
*Director of the United States Patent and Trademark Office*